Dec. 4, 1951  M. L. TAYLOR  2,577,047
VARIABLE VENT PARACHUTE
Filed Sept 9, 1949  3 Sheets-Sheet 1

INVENTOR.
MYRON L. TAYLOR
BY *Willard D. Eakin*
ATTORNEY

Dec. 4, 1951 M. L. TAYLOR 2,577,047
VARIABLE VENT PARACHUTE
Filed Sept 9, 1949 3 Sheets-Sheet 2

INVENTOR.
MYRON L. TAYLOR
BY Willard D. Eakin
ATTORNEY

Dec. 4, 1951    M. L. TAYLOR    2,577,047
VARIABLE VENT PARACHUTE
Filed Sept 9, 1949    3 Sheets-Sheet 3

INVENTOR.
MYRON L. TAYLOR
BY *Willard D. Eakin*
ATTORNEY

Patented Dec. 4, 1951

2,577,047

UNITED STATES PATENT OFFICE 2,577,047

VARIABLE VENT PARACHUTE

Myron L. Taylor, Hudson, Ohio

Application September 9, 1949, Serial No. 114,699

4 Claims. (Cl. 244—145)

This invention relates to parachutes having a resiliently restricted vent opening adapted to be automatically enlarged for large flow capacity in response to high decelerating force, as in the case of a parachute launched from an airplane at high speed or launched in a condition of overload, to prevent excessive shock or strain on the parachute or its load, and then automatically to become smaller as the decelerating force becomes less, to lessen the escape of air through the vent as the velocity of the parachute decreases and thus to maintain a high resistance for a given velocity and provide a desirably low ultimate velocity after having permitted a high initial or early velocity without excessive shock or strain.

My chief objects are to provide, for varying the vent's flow capacity in accordance with the deceleration force, resilient restricting means that will have the advantage of not losing resilience or becoming frangible at very low temperature, as in the case of some otherwise desirable rubber compositions; the advantage of not being subject to deterioration by abrasion, as in the case of a rubber recoil element having slight or substantial rubbing contact with another element; the advantage of being adapted for easy and safe manipulation in the matter of being packed and released; and the advantages of strength, lightness and durability.

Figure 1:
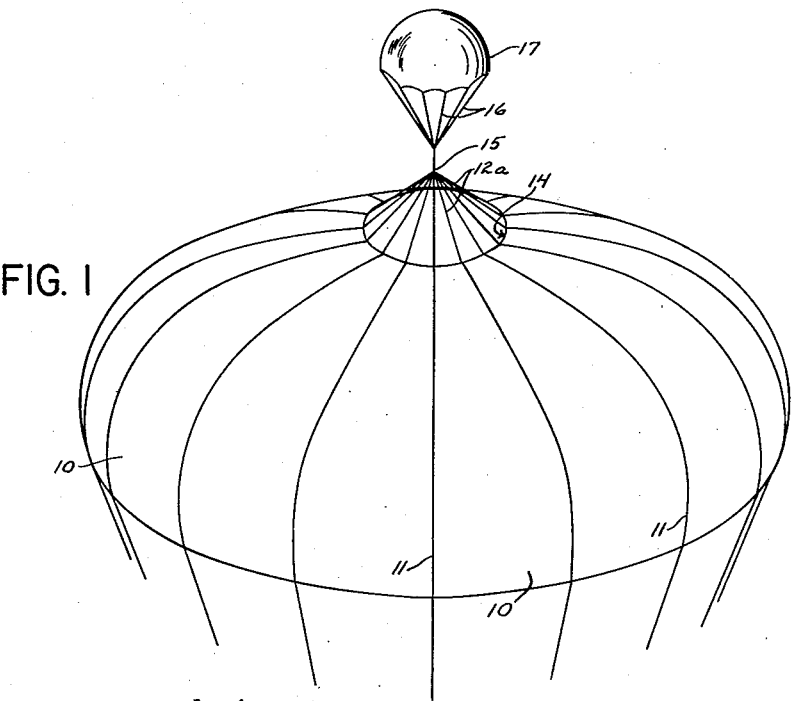
Fig. 1 is a perspective view of a parachute embodying my invention in its preferred form.
Figure 2:
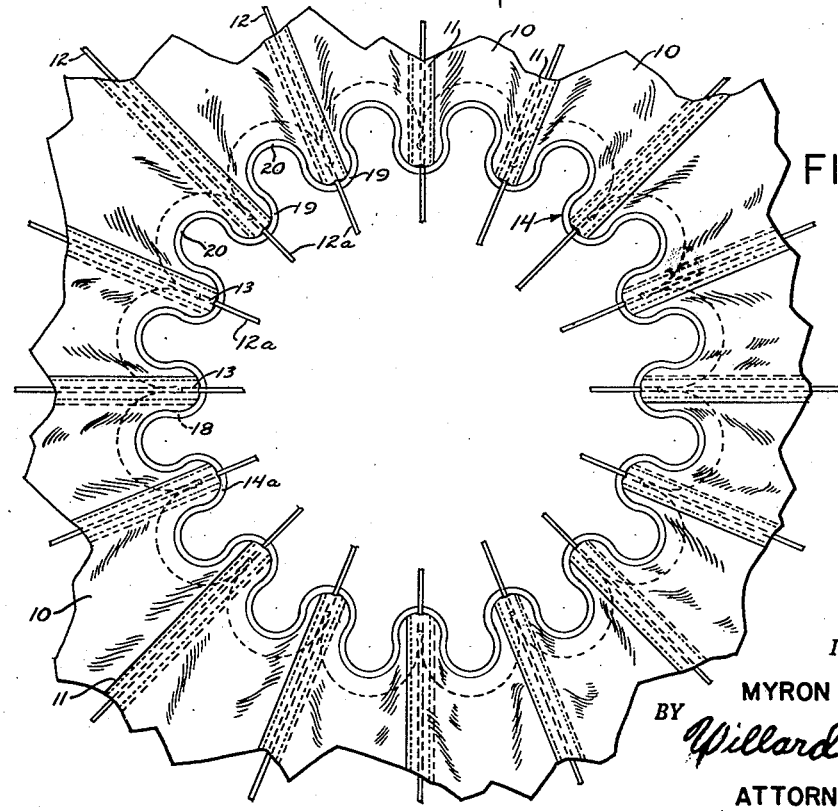
Fig. 2 is a fragmentary plan view of the central portion of the same, showing contractile means defining the vent opening.

The embodiment shown in Figs. 1 and 2 comprises a canopy formed of gores 10, 10 joined to one another in the usual hem type double seams 11, 11 and having shroud lines 12, 12 extending lengthwise in the seams and each locally secured at 13, as by sewing, to a contractile collar 14.

From their points of anchorage at 13, 13 to the collar the shroud lines continue inwardly, with slackness when the vent opening is not distended, and at a meeting point 15 (Fig. 1) these extensions, 12$^a$, 12$^a$, are joined to each other and to the shroud lines 16, 16 of a pilot chute 17. Thus the set of shroud line extension 12$^a$, 12$^a$ provide substantially inextensible cross-tie members for limiting, on occasion, the enlargement of the parachute's vent opening.

The contractile collar 14 comprises a fabric cover 14$^a$ enclosing in a medial fold thereof an endless spring-steel member 18 consisting of a succession of inward and outward C-shaped bays, 19, 19 and 20, 20, each preferably having the form of the arc of a circle, for evenness of strain in circumferential extension of the collar, and preferably an arc of more than 180°, for high variability of the flow capacity of the vent opening.

In this embodiment the inward and outward bays 19, 20 all lie "in the same plane" when in an unstrained condition. The anchorage 13, 13 of the shroud lines to the collar 14 are respectively at the innermost parts of the inward bays of the collar and the pull of the pilot chute and other forces incident to the early part of the opening of the main chute can distort the spring steel member 18 to a somewhat conical general form, but when the full distending force of the main parachute is applied to it by the full opening out of the main chute the bays of the spring member will assume such attitudes as are determined by the balancing of the system of forces acting upon them.

In the mounting and seaming of the fabric covering 14$^a$ upon the spring-steel member 14 the latter preferably is held by suitable means in a distended condition, short of its elastic limit, for lessening the sharpness of the curvature of the bays, and the same expedient can be resorted to for the sewing of the canopy to the collar. When the steel member, in final condition of association with the fabric, is then allowed to return to unstrained condition, fullness of parts of the fabric flange portion of the collar, and parts of the adjacent annular marginal portion of the canopy, occurs in an orderly manner, without substantial creepage of the permissibly tight fitting fabric upon the steel member. Thus the fullness of fabric is properly distributed for allowing the vent opening to enlarge and contract in service. Preferably bias fabric is used for the fabric element 14$^a$ of the collar, so that it can be of conical or even of plane normal form although made of a single piece of fabric.

In this embodiment of Figs. 1 and 2 there is no preloading of the resilient member and because of that the vent opening can start its enlargement from a size suitably small for assuring quick filling out of the main parachute by reason of the small initial flow capacity of the vent. Nevertheless the construction is such that the opening can approach maximum size with the same resistance that it would have if it were expanding from a preloaded condition, and consequently with the same avoidance of excessive shock or maximum strain upon the parachute or its load.

The enlargement and contraction of the opening are permitted and effected by simple resilient flexing of the metal member, as distinguished from the lengthwise stretching and retraction of a tension member.

Figure 4:
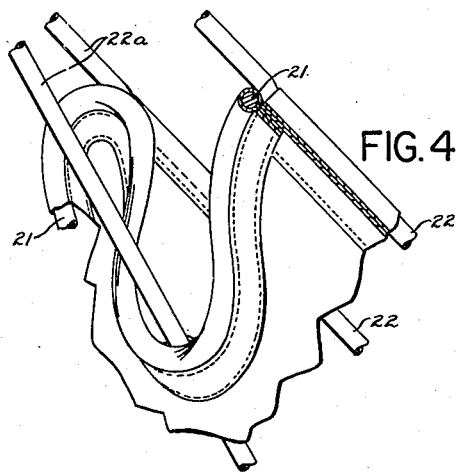
Fig. 4 is a section on line 4—4 of Fig. 3.
Figure 3:
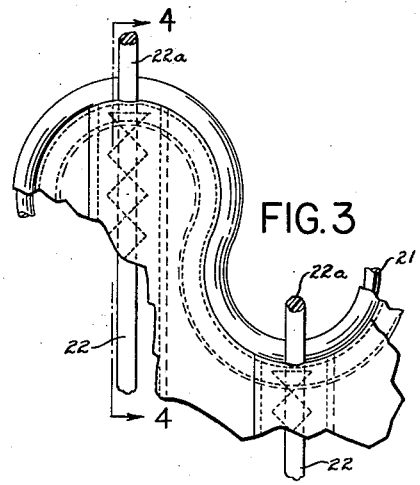
Fig. 3 is a fragmentary side elevation of a portion of the contractile means and adjacent parts of a construction alternative to that shown in Figs. 1 and 2.

In the alternative embodiment shown in Figs. 3 and 4, the construction corresponds substantially to that of Figs. 1 and 2 except that the endless spring-steel member, 21, when in an unstrained condition, has its bays extending in non-horizontal, permissibly vertical, "planes," and each of the oppositely disposed bays has one of the shroud lines, 22, with its cross-tie extension, 22ᵃ, at the middle of the bay. This calls for only half as many bays, but each of twice the size, as compared with the arrangement shown in Fig. 2.

Assuming that the bays are vertical or nearly vertical and that the shroud-line extensions 22ᵃ, 22ᵃ, corresponding to the extensions 12ᵃ of Figs. 1 and 2, are all of the same length, in the construction represented by Figs. 3 and 4, then the pull of the pilot chute will be sustained chiefly by the elements 22ᵃ that extend from the middle parts of the downwardly disposed alternate bays, with consequently some inward movement of those bays in relation to the upwardly disposed bays, but when the main parachute fully fills out and the full distending force is thus applied to the collar that force will dominate over the pull of the pilot chute and the bays of the resilient member will be returned toward their more nearly vertical original positions and fabric tensions lengthwise of the shroud lines will be substantially uniform throughout the circle.

If the opening so enlarges that further enlargement is prevented by drawing taut of the cross ties provided by the shroud line extensions, and if those ties are all of the same length, then the tension in alternate ones of them will hold the upper bays of the collar inward with relation to the lower bays, so that the bays will assume approximately vertical positions, and, as the outer ends of the upper set of ties have moved downward and the outer ends of the lower set of ties have moved upward, in the expansion of the collar, the only deformation of the canopy enforced by the wavy form of the collar will be a moderate undulation, about the circle, of its annular marginal zone in the vicinity of the collar.

In this embodiment of Figs. 3 and 4, also, bias fabric preferably is used for the fabric element of the collar, so that, without undue strain of any part, it can be deformed to various generally-conical shapes from cylindrical to plane.

The steel member of Figs. 3 and 4, especially when of cylindrical or close-to-cylindrical general form, has the virtue of being easily controlled in flattening of the collar, if desired, for packing of the parachute.

Figure 5:
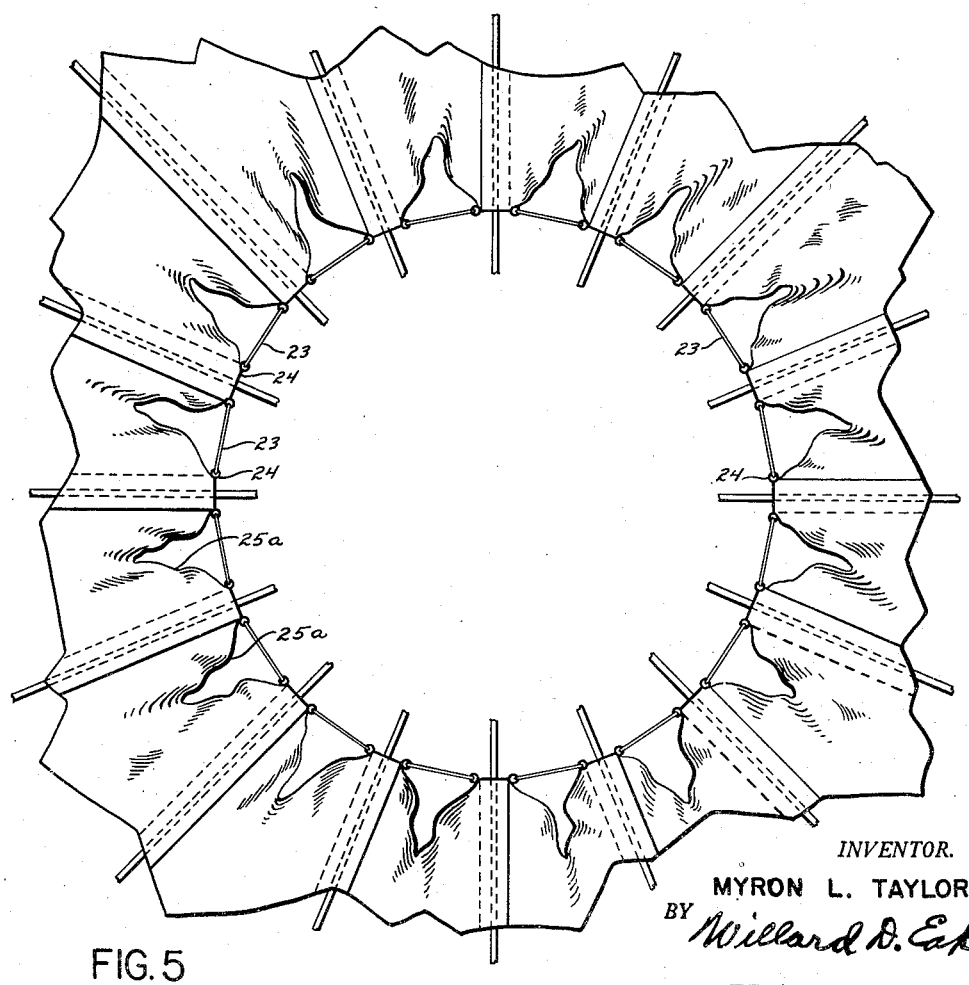
Fig. 5 is a fragmentary plan view of the central portion of a parachute embodying another modification of my invention.
Figure 6:
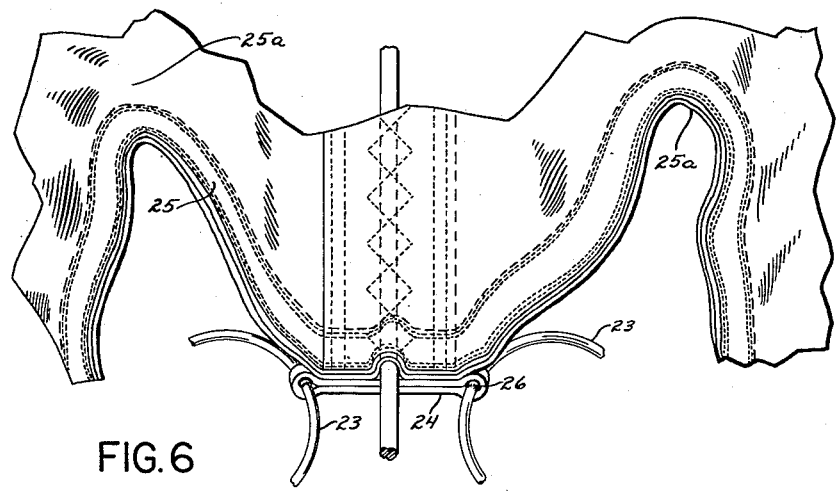
Fig. 6 is a fragmentary plan view, on a larger scale, of a portion of the structure shown in Fig. 5.
Figure 7:
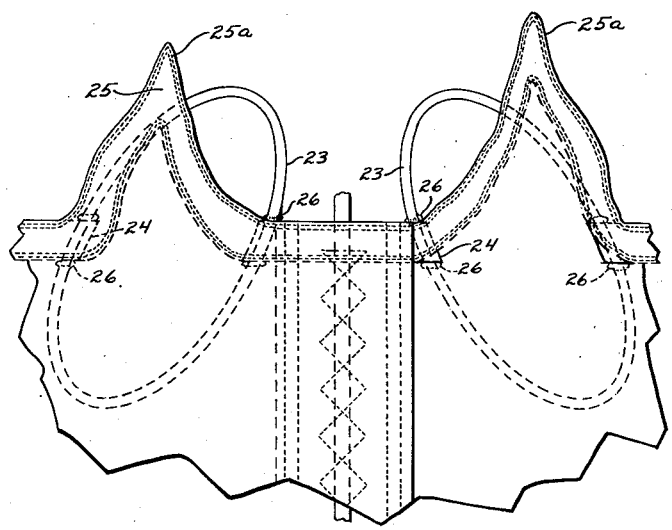
Fig. 7 is a fragmentary side elevation of parts shown in Figs. 5 and 6.

In the embodiment shown in Figs. 5 to 7 the contractile collar comprises a circumferential series of preferably endless spring-steel members 23, 23 connected to one another by fabric links 24, 24. An endless fabric collar element 25, having the annular margin of the canopy sewed to it, is sewed to the fabric links 24, with fullness of the collar fabric and the canopy fabric in the respective reaches, 25ᵃ, 25ᵃ, between links, to permit enlargement of the vent opening.

The endless spring members 23 can be of any suitable shape to provide greater range of permissible percentage deformation than circular rings would give. The rings here shown, for example, are of elliptical form, with the major axis of the ellipse transverse to the direction of the collar's stretch.

Each spring member 23 can be provided with means, such as shoulder flanges 26, 26, to prevent slippage of the member 23 in the eye of the link as the collar expands and contracts and in so doing permissibly changes its cone angle.

For the purpose of illustration, and not of limitation, the several parts are shown as having such form as to give the collar assembly the general shape, in unstrained condition, of a cone of about a 45° angle, from which angle it can be easily deformed in either direction as determined by the balancing of the forces to which it is subjected in service.

This embodiment has the virtue of collapsibility of the collar for packing purposes without putting the resilient members under distorting strain.

My invention is not wholly limited to an assembly in which the resilient members are endless.

Other modifications are possible within the scope of the invention as defined in the appended claims, in which, for succinctness, the word canopy is used as being inclusive of the fabric element of the collar.

I claim:

1. A parachute comprising a canopy having a margin defining a vent opening and, operatively associated with said margin for permitting enlargement, and by recoil effecting reduction, of the flow capacity of the opening, an endless, one-piece spring metal member extending in general circumferentially of the opening but of devious form for general elongation by flexure.

2. A parachute comprising a canopy having a margin defining a vent opening and, operatively associated with said margin for permitting enlargement, and by recoil effecting reduction, of the flow capacity of the opening, an endless, one-piece spring metal member extending in general circumferentially of the opening but of devious form for general elongation by flexure, said member having flexible reaches of C-shaped bayed form disposed oppositely with relation to a median line of the member and with the chord of each C disposed circumferentially with relation to the opening.

3. A parachute comprising a canopy having a margin defining a vent opening and resilient means operatively associated with said margin for permitting enlargement, and by recoil effecting reduction, of the flow capacity of the opening, said resilient means being so formed, disposed and connected to said margin as to have its expansion and contraction in directions substantially parallel to the plane of the mouth of the opening and comprising as its resilient material C-spring elements of which the chords are at least approximately parallel to thes aid plane.

4. A parachute comprising a canopy having a margin defining a vent opening and resilient means operatively associated with said margin for permitting enlargement, and by recoil effecting reduction, of the flow capacity of the opening, said resilient means being so formed, disposed and connected to said margin as to have its expansion and contraction in directions substantially circumferential with relation to the mouth of the opening and comprising endless spring members connected with one another by intervening links to which, with fullness, the canopy margin defining the opening is secured.

MYRON L. TAYLOR.

REFERENCES CITED

The following references are of record in the file of this patent:

UNITED STATES PATENTS

| Number | Name | Date |
| --- | --- | --- |
| 1,340,259 | Taylor | May 18, 1920 |
| 2,350,646 | Smith | June 6, 1944 |

FOREIGN PATENTS

| Number | Country | Date |
| --- | --- | --- |
| 361,431 | Italy | July 21, 1938 |